L. R. BEACH.
PLOW IRON.
APPLICATION FILED FEB. 14, 1908.
910,985.
Patented Jan. 26, 1909.
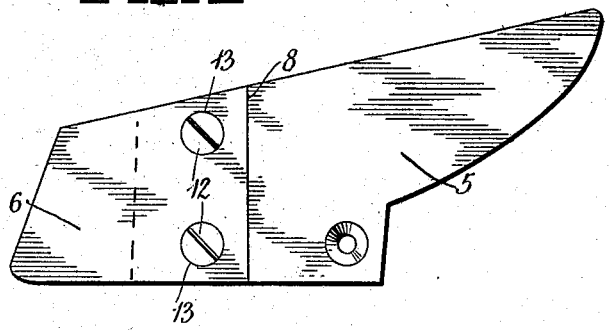
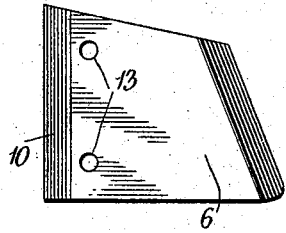
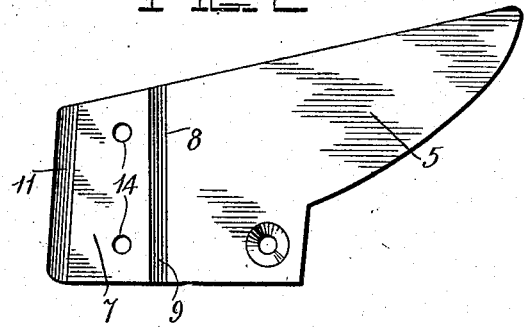
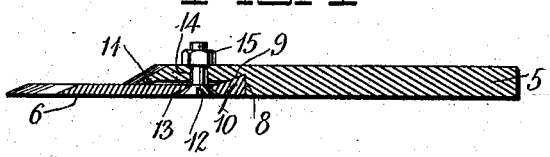
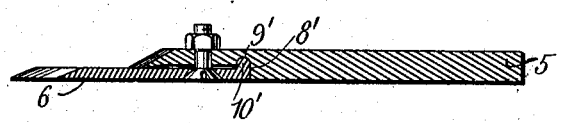
Witnesses
Inventor
L. R. Beach
By
Attorneys

UNITED STATES PATENT OFFICE.

LONIE R. BEACH, OF COLQUITT, GEORGIA, ASSIGNOR OF ONE-HALF TO C. C. BUSH, OF COLQUITT, GEORGIA.

PLOW-IRON.

No. 910,985.  Specification of Letters Patent.  Patented Jan. 26, 1909.

Application filed February 14, 1908. Serial No. 415,930.

*To all whom it may concern:*

Be it known that I, LONIE R. BEACH, a citizen of the United States, residing at Colquitt, in the county of Miller, State of Georgia, have invented certain new and useful Improvements in Plow-Irons; and I do hereby declare the following to be a full, clear, and exact description of the invention, such as will enable others skilled in the art to which it appertains to make and use the same.

This invention relates to new and useful improvements in plow shares and it has more particular reference to a plow share employed in connection with a detachable plow point, this construction being advantageous since new points may be placed from time to time on old iron at much less expense than the purchase of an entire new plow share.

The invention aims as a primary object to provide a plow point and iron of novel coöperative construction, tending towards ease of assemblage and efficiency in use.

The details of construction will appear in the course of the following description, in which reference is had to the accompanying drawings, forming a part of this specification, like characters of reference designating similar parts, throughout the several views, wherein:—

Figure 1 is a front elevation of the device in its entirety. Fig. 2 is a similar view of the plow share. Fig. 3 is a similar view of the plow point. Fig. 4 is a central longitudinal sectional view illustrating the point and the iron in their assembled relation. Fig. 5 is a similar view illustrating a slightly modified embodiment of the invention.

In the accompanying drawing, the numeral 5 designates a mold-board and 6 a plow point. In the preferred embodiment of the invention, the mold board 5 has one face cut away to form a reduced portion as at 7, with respect to the remaining portion of the said mold board, whereby a transverse shoulder is afforded across the front face thereof. Said reduced portion 7 has an inclined surface adjacent the shoulder 8 and extending entirely across the mold board 5, to form a recess 9, coextensive with the said shoulder. The plow point 6 is designed to be fitted into the cut away portion of the mold board and contiguous with the reduced portion 7, and which point has at one edge a projection 10, correspondingly shaped to the recess 9 and fitted within the same. The reduced portion 7 has its free edge beveled slightly as at 11 so as to afford a gripping edge for frictional contact with the adjacent face of the plow point 6, which latter is held in the relation stated by bolts 12 passing through openings 13 in the point 6 and openings 14 in the reduced portion 7, the bolts 12 being held by nuts 15, bearing against the rear face of the portion 7, the heads of said bolts being countersunk in the openings 13.

In the modified embodiment of the invention, illustrated in Fig. 5, a transverse groove 9' is provided adjacent the shoulder 8', the groove 9' corresponding to the inclined face 9 and forming a continuation of the wall of said shoulder. The plow point 6 has at its upper end, a transverse bead 10' which projects from its rear face and is designed to conformably interfit the groove 9'. With the exception of this slight departure, the construction illustrated in the modified embodiment of the invention is similar to that illustrated in the preferred embodiment thereof.

The advantages of the present device are twofold and reside in the ease of assemblage and in the firmness with which the parts are held when assembled. The point is accurately centered with relation to the plow share by reason of the wedge-shaped portion 10 bearing against the shoulder 8 and the inclined face 9, or in the modified embodiment of the invention of the bead 10' fitting in the groove 9'. These same features combined with the gripping edge 11, assure of a strong frictional contact between the parts in their assembled relation, which is enhanced by the fact that the nuts 15 may be tightened with greater force than if the faces of the point 6 and portion 7 contacted throughout their area. Hence, the point 6 is as far as possible, prevented from working loose by vibration.

The invention is simple in its structural details, inexpensive to manufacture and practical and efficient in use.

What is claimed is:

In combination, a mold board having a reduced portion forming a shoulder transversely across the same, said mold board having a recess transversely therein and coextensive with said shoulder, a plow point having at one edge a projection correspondingly shaped to said recess and fitted within the same and means fastening said point to the reduced portion of the mold board.

In testimony whereof, I affix my signature, in presence of two witnesses.

LONIE R. BEACH.

Witnesses:
CHARLIE his X mark TENANT,
B. B. BUSH.